United States Patent
Ezov et al.

(10) Patent No.: US 11,281,728 B2
(45) Date of Patent: Mar. 22, 2022

(54) DATA GENERALIZATION FOR PREDICTIVE MODELS

(71) Applicant: International Business Machines Corporation, Armonk, NY (US)

(72) Inventors: Gilad Ezov, Nesher (IL); Ariel Farkash, Shimshit (IL); Abigail Goldsteen, Haifa (IL); Ron Shmelkin, Haifa (IL); Micha Gideon Moffie, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 16/532,505

(22) Filed: Aug. 6, 2019

(65) Prior Publication Data
US 2021/0042356 A1   Feb. 11, 2021

(51) Int. Cl.
*G06F 16/906*  (2019.01)
*G06K 9/62*    (2022.01)

(52) U.S. Cl.
CPC ......... *G06F 16/906* (2019.01); *G06K 9/6215* (2013.01); *G06K 9/6218* (2013.01)

(58) Field of Classification Search
CPC ... G06F 16/906; G06K 9/6215; G06K 9/6218
USPC ........................................................ 707/737
See application file for complete search history.

(56) References Cited

U.S. PATENT DOCUMENTS

| 8,250,013 | B2  |   | 8/2012  | Fung et al. |   |
|---|---|---|---|---|---|
| 10,043,035 | B2 |   | 8/2018 | LaFever et al. |   |
| 10,311,361 | B1 | * | 6/2019 | Durham | G06N 20/00 |
| 2015/0262077 | A1 | * | 9/2015 | White | G06N 20/00 706/12 |
| 2016/0292455 | A1 |   | 10/2016 | Jebara et al. |   |
| 2018/0300576 | A1 | * | 10/2018 | Dalyac | G06K 9/6218 |
| 2020/0250580 | A1 | * | 8/2020 | Harman | G06N 20/00 |

OTHER PUBLICATIONS

McCallum, Andrew, et al., "Efficient Clustering of High-Dimensional Data Sets with Application to Reference Matching", KDD 2000, Boston, MA, © ACM 2000, pp. 169-178.*
Rokach, Lior, et al., Data Mining and Knowledge Discovery Handbook, Chapter 15: Clustering Methods, © Springer 2005, pp. 321-352.*

* cited by examiner

*Primary Examiner* — Robert Stevens
(74) *Attorney, Agent, or Firm* — Ziv Glazberg (57) ABSTRACT

A method, apparatus and a product for data generalization for predictive models. The method comprising: based on a labeled dataset, determining a plurality of buckets, each of which has an associated label; determining a plurality of clusters, grouping similar instances in the same bucket; based on the plurality of clusters, determining an alternative set of features comprising a set of generalized features, wherein each generalized feature corresponds to a cluster of the plurality of clusters, wherein a generalized feature that corresponds to a cluster is indicative of the instance being mapped to the corresponding cluster; obtaining a second instance; determining a generalized second instance that comprises a valuation of the alternative set of features for the second instance; and based on the generalized second instance, determining a label for the second instance.

20 Claims, 4 Drawing Sheets

103

| 30 | 33 | 35 | 16 | 20 | 42 |
| M | F | M | F | F | M |
| Brown | Brown | Black | Brown | Brown | Black |

← 101

| 51 | 43 | 60 | 41 | 40 | 41 |
| F | F | F | F | M | M |
| Blonde | Black | Red | Black | Black | Brown |

| 30 | 33 | 35 |
| M | F | M |
| Brown | Brown | Black |

112

| 16 | 20 |
| F | F |
| Brown | Brown |

113

| 42 |
| M |
| Black |

DATA GENERALIZATION FOR PREDICTIVE MODELS

TECHNICAL FIELD

The present disclosure relates to generalizing data in general, and to generalizing data for a predictive model using clustering, in particular.

BACKGROUND

Data minimization may refer to the practice of limiting the collection of personal information to that which is directly relevant and necessary to accomplish a specified purpose. As companies and organizations began to understand the power of data, and as data becomes more ubiquitous and easier to collect, analysts are faced with an overwhelming amount of data. For a time, the impulse was to save all of it—indefinitely. With the fast adoption of smartphones, Internet of Things (IoT) devices, or the like, organizations are faced with more and more ways to collect more and more kinds of data, including and especially private, personally identifiable data. Instead saving everything, data managers are now embracing a data minimization policy, keeping only what's relevant and necessary.

BRIEF SUMMARY

One exemplary embodiment of the disclosed subject matter is a method comprising: obtaining a labeled dataset, wherein the labeled dataset comprises a plurality of instances and labels thereof, wherein each instance comprises a valuation of a set of features; based on the labels, determining a plurality of buckets, each of which has an associated label, wherein each bucket groups instances from the labeled dataset that have a label that is within a similarity threshold from the associated label of the bucket; determining a plurality of clusters, wherein each cluster comprises a plurality of instances that are comprised by a same bucket, wherein said determining a plurality of clusters is based on valuations of the set of features for the instances, whereby grouping similar instances into a cluster; based on the plurality of clusters, determining an alternative set of features comprising a set of generalized features, wherein each generalized feature in the set of generalized features corresponds to a cluster of the plurality of clusters, wherein a generalized feature that corresponds to a cluster is indicative of the instance being a member of the corresponding cluster; obtaining a second instance; determining a generalized second instance, wherein the generalized second instance comprises a valuation of the alternative set of features for the second instance; and based on the generalized second instance, determining a label for the second instance.

Another exemplary embodiment of the disclosed subject matter is a computer program product comprising a non-transitory computer readable storage medium retaining program instructions, which program instructions when read by a processor, cause the processor to perform: obtaining a labeled dataset, wherein the labeled dataset comprises a plurality of instances and labels thereof, wherein each instance comprises a valuation of a set of features; based on the labels, determining a plurality of buckets, each of which has an associated label, wherein each bucket groups instances from the labeled dataset that have a label that is within a similarity threshold from the associated label of the bucket; determining a plurality of clusters, wherein each cluster comprises a plurality of instances that are comprised by a same bucket, wherein said determining a plurality of clusters is based on valuations of the set of features for the instances, whereby grouping similar instances into a cluster; based on the plurality of clusters, determining an alternative set of features comprising a set of generalized features, wherein each generalized feature in the set of generalized features corresponds to a cluster of the plurality of clusters, wherein a generalized feature that corresponds to a cluster is indicative of the instance being a member of the corresponding cluster; obtaining a second instance; determining a generalized second instance, wherein the generalized second instance comprises a valuation of the alternative set of features for the second instance; and based on the generalized second instance, determining a label for the second instance.

Yet another exemplary embodiment of the disclosed subject matter is a computerized apparatus having a processor and coupled memory, the processor being adapted to perform the steps of: obtaining a labeled dataset, wherein the labeled dataset comprises a plurality of instances and labels thereof, wherein each instance comprises a valuation of a set of features; based on the labels, determining a plurality of buckets, each of which has an associated label, wherein each bucket groups instances from the labeled dataset that have a label that is within a similarity threshold from the associated label of the bucket; determining a plurality of clusters, wherein each cluster comprises a plurality of instances that are comprised by a same bucket, wherein said determining a plurality of clusters is based on valuations of the set of features for the instances, whereby grouping similar instances into a cluster; based on the plurality of clusters, determining an alternative set of features comprising a set of generalized features, wherein each generalized feature in the set of generalized features corresponds to a cluster of the plurality of clusters, wherein a generalized feature that corresponds to a cluster is indicative of the instance being a member of the corresponding cluster; obtaining a second instance; determining a generalized second instance, wherein the generalized second instance comprises a valuation of the alternative set of features for the second instance; and based on the generalized second instance, determining a label for the second instance.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to minimize the data that is collected from users. In some exemplary embodiments, an entity collecting data may be subject to General Data Protection Regulation (GDPR) regulations. As such, the entity may be required to limit data collection to data that is necessary in relation to the purpose for which the data may be processed. Additionally, or alternatively, GDPR and similar regulations may require that private data that is collected be stored and protected in certain ways. Hence, reduction of the amount of data that is stored may reduce the liabilities of the entity.

Another technical problem dealt with by the disclosed subject matter is to minimize the data that is being collected with respect to a decision model. In some cases, it may be desired to minimize the data, e.g., the number of features that are being collected and their respective granularities, while still being able to utilize the decision model to provide quality decisions, predictions, or the like. As an example, the same data records may be utilized by a predictive model that is configured to predict a heart attack and by predictive model that is configured to predict the number of offsprings of a person. Different types of data minimization may be applied for each decision model, such as different types of feature generalizing. As an example, the first predictive model may have a performance measurement above 90% in case that the age feature is generalized to ranges of 5 years while the second predictive model may have a performance measurement below 80% in case that the age feature is generalize to such range. As another example, one model may be sensitive to the age being above 50 and the precise value thereof, while the other may be indifferent and provide similar predictions for all values above 40. In some cases, the decision model may be a manual model that is utilized by the entity for its decision making, such as, for example, decisions made by a banker to approve or decline a loan, a decision made by a banker as to the maximal credit to authorize, a decision made by a clerk to provide a quote for a service to be rendered, or the like.

Yet another technical problem dealt with by the disclosed subject matter is to minimize the data provided to a predictive model without affecting the performance measurement of the predictive model. It may be desired to minimize the data without causing the performance measurement of the predictive model to decrease below a threshold. The threshold may be an absolute threshold such as 90%, 92%, or the like. Additionally or alternatively, the threshold may be a relative threshold, relative to the performance measurement of the predictive model before the data minimization. As an example, it may be desired that the after minimizing the data, the performance measurement may not decrease more than 5%.

One technical solution is to determine a generalization of a set of features utilized by the decision model. In some exemplary embodiments, an alternative set of features may be determined instead of the set of features. The alternative set of features may comprise a set of generalized features. A generalized feature may be generalization of one or more features from the set of features. Generalizing the set of features may yield data minimization.

In some exemplary embodiments, the alternative set of features may be determined using a clustering process. A generalized feature may be associated with a cluster determined during the clustering process.

Another technical solution is to perform a 2-phase clustering process. The first phase may be based on labels comprised by a labeled dataset and may yield a plurality of buckets, each of which may be associated with a value of a label. The second phase may be based on valuations of features of instances comprised by the labeled dataset.

In some exemplary embodiments, the second phase may be applied on instances comprised by at least one bucket. A clustering algorithm, such as K-means, Hierarchical clustering, Affinity Propagation, or the like, may be utilized.

In some exemplary embodiments, a bucket may group instances from a labeled dataset having a label that is within a similarity threshold from the label that is associated with the bucket. As an example, the bucket may be associated with a label of age of 30 years. The similarity threshold may define a range of 2 years, yielding that instances having an age label that is between 29 and 31 may be grouped to the bucket. In some exemplary embodiments, the similarity threshold may be an equality threshold, an identity threshold, or the like, yielding that the bucket groups instances having the exact same label.

It is noted that grouping instances to buckets may be based on similarity threshold of the labels while determining clusters may be performed at each bucket based on similarity of valuations of features. Additionally or alternatively, a cluster may group instances that are comprised by the same bucket. In some exemplary embodiments, each cluster may be associated with a bucket. Additionally or alternatively, for a single bucket, there may be a plurality of clusters that are determined.

In some exemplary embodiments, a second instance may be obtained and a label may be determined for the second instance. The second instance may be an unseen instance, such as an instance that is not comprised by a labeled data set, an instance for which a label is not available and needs to be determined, or the like. In some exemplary embodiments, the second instance may be obtained without having a known corresponding label. In some cases, generalizing the second instance may be based on a valuation of the alternative set features of the second instance. The valuation of the alternative set of features may yield a corresponding generalized instance for the second instance. The generalized instance may be indicative to one or more clusters that comprise the second instance, also referred to as identified clusters. As an example, the second instance may be a mapped to a single cluster (also referred to as a "member of" the single cluster). Additionally or alternatively, the second instance may be mapped to more than one cluster. In some exemplary embodiments, a label may be determined for a generalized instance based on the labels of the one or more identified clusters. As an example, if the generalized instance indicates mapping to a single cluster, the label associated thereto, a mean of the labels associated therewith, or the like, may be determined as the label of the generalized instance. As another example, if the generalized instance indicates membership in two or more clusters, a label may be determined based on one or more labels of at least a portion of the identified clusters. In some exemplary embodiments, a membership measurement may be computed and utilized to determine the label. The membership measurement may be indicative to which cluster the second instance is most associated with. As an example, it may be desire to label an instance representing a person as a lawyer or as a patent attorney. The instance may have at least two features that are indicative to revenue channels, such as a feature indicative to the income of the person from litigation and a feature indicative to the income of the person from drafting patent applications. Several generalized feature may be determined, each of which may correspond to a different cluster. Some clusters may comprise instances that are labeled as "lawyers" and some clusters may comprise instances that are labeled as "patent attorneys". An instance to be labeled may be analyzed and determined to be mapped to two different clusters, a first cluster that is associated with the "lawyer" label and a second cluster that is associated with the "patent attorney" label. A membership measurement, measuring the membership of the instance in each cluster, may be defined. As an example, the membership function may be defined by measuring each revenue channel. In case that the person's income from litigation is higher than the person's income from drafting (e.g., with or without normalization), it may be determined that the instance is more of a member in the lawyers cluster and the instance may be labeled as a lawyer. On the other hand, in case that the person's income from drafting is higher than the person's income from litigation, it may be determined that the instance is more of a member in the patent attorneys cluster than the lawyers cluster and the instance may be labeled as a patent attorney. It may be noted that the membership measurement may return the same measurement over the two clusters (e.g. the person's income from litigation is equal to the person's income from litigation, or that both normalized incomes are equal). In that case, the instance may be an outlier and a label may be determined randomly between the two options.

Additionally or alternatively, by measuring a distance from a centroid of each cluster, it may be determined whether the person is more representative of a patent attorney or of a lawyer. In some cases, the generalized features may comprise a distance measurement from the centroid of each cluster. The label may be determined based on the label of the cluster to which the instance is closest to (e.g., the identified cluster for which the value of the corresponding generalized feature is the lowest). Additionally, or alternatively, the label may be determined based on a weighted average or other computation that takes into account the similarity measurement of the instance to each identified cluster, as may be exhibited by the value of the generalized features.

In some exemplary embodiments, in order to determine a label for an instance, a concrete instance may be determined. The instance may be generalized to a generalized instance in order to minimize data exposure. Based on the generalized instance, a concrete instance may be determined. The concrete instance may comprise valuations of the original features and not of the alternative set of features used to represent generalizations. The concrete instance may be provided to a decision model in order to determine a label for the instance. The decision model may be an automated model, a predictive model, a manual decision process performed by people, or the like. In some cases, the concrete instance may be a statistical representation of observed instances that are members of the identified clusters. An observed instance may be an instance that was previously observed during the practice of the disclosed subject matter, such as comprised by a labeled dataset, as part of the training dataset, provided to the decision model, or the like. A statistical representation of observed instances may be the average of observed instances, the mode of observed instances, the mean of observed instances, or the like. Additionally or alternatively, the cluster comprising the instance may have a centroid and the cluster may comprise the centroid. An example to a cluster comprising its centroid may be a convex cluster. In that case, the centroid may be the concrete value. Additionally, or alternatively, in case the instance is comprised by a plurality of identified clusters, a computation based on the observed instances, centroids, or the like of each of them may be performed to generate a concrete instance. As another example, the concrete instance that is generated may be determined to be comprised by all clusters that the original instance was comprised by, such as may be generated based on an intersection of all identified clusters. The concrete instance may be generated as a centroid of the intersected cluster, based on observed instances in the interested cluster, or the like.

In some exemplary embodiments, the concrete instance may be the centroid in case that the number of observed instances is below a threshold. Once that the number of observed instances is above the threshold, the concrete instance may be a statistical representation of observed values.

In some exemplary embodiments, the labeled dataset utilized by the disclosed subject matter may be determined using a predictive model. In some exemplary embodiments, an unlabeled dataset may be obtained. The predictive model may be applied on the unlabeled dataset. Using the predictive model, a predicted label may be determined for each instance in the unlabeled dataset, yielding the labeled dataset. This may contrary to conventional labeled datasets, which are conventionally labeled with accurate and correct labels, and not with predicted labels.

In some exemplary embodiments, an instance may be obtained and generalized on an edge device. The generalization of the instance may be transmitted to a server and a label may be determined for the second instance on the server.

One technical effect of utilizing the disclosed subject matter is a minimization of the data that may be required for the decision model in order to determine a label. Instead of divulging the complete information, a minimized representation thereof may be divulged, reducing private information retained and processed.

Another technical effect of utilizing the disclosed subject matter is a reduction in computational resources needed for predicting a label for an instance. In some exemplary embodiments, instead if applying a predictive model, a relatively non-competently intensive computation may be applied based on the identified clusters. In some cases, the predictive model may be an ANN (Artificial Neural Network) model such as CNN (Convolution Neural Network), RNN (Recurrent Neural Network), a DNN (Deep Neural Network), or the like, a non-ANN model, such as a decision tree, a SVM (Support Vector Machine), or the like. In some exemplary embodiments, the disclosed subject matter may provide a prediction using a reduced amount of computational resources compared to the resources required to apply the predictive model itself.

Yet another technical effect of utilizing the disclosed subject matter is a reduction in storage space required for storing the data, bandwidth required for transmitting the data and power that is required for transmitting the data. In some exemplary embodiments, data instances may be retained for future usages, such as domain-specific usages, quality assurance, training of other models, retraining the predictive model, or the like. Additionally or alternatively, it may be desired to transmit data instances to a remote server. As an example, a data instance may be obtained from an IoT device. The IoT device may measure temperature, humidity, light, or the like every second. Instead of retaining exact values, recoding may be applied to utilize a reduced amount of bits to represents the more generalized data. In some cases, the generalization may be considered as a form of lossy compression that loses insignificant information with respect to the decision model that is used by the server that collects that data from the IoT devices.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Figure 1A:
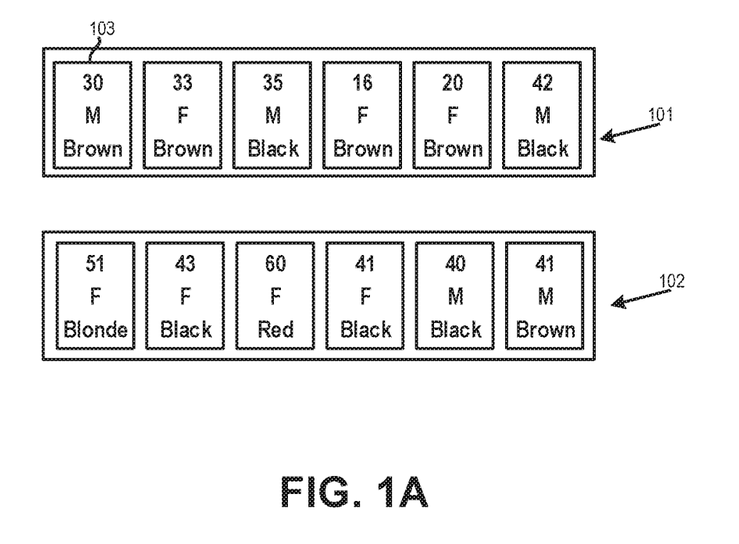
FIGS. 1A and 1B show buckets and clusters, in accordance with some exemplary embodiments of the disclosed subject matter.
Figure 1B:
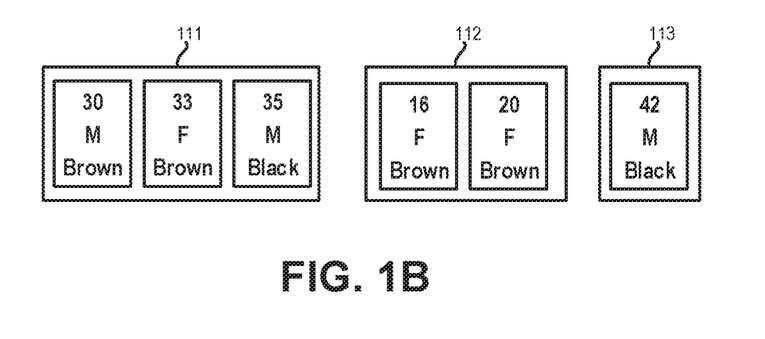

Referring now to FIGS. 1A and 1B showing buckets and clusters, in accordance with some exemplary embodiments of the disclosed subject matter.

FIG. 1A shows instances, such as Instance 103. Each instance comprises values to each feature of a set of features. For example, Instance 103 has the valuation {age=30, gender=M, hair color=brown}. Each instance may be associated with a label, such as a label of True or False regarding a Boolean property, a wage property, or the like.

The instances may be distributed into buckets, Such as Buckets 101, 102. Each bucket comprises instances that have the same label, or that have similar labels, such as labels having a similarity measurement of no more than a threshold from a label of the bucket. For example, Bucket 101 may comprise all instances having True label while Bucket 102 may comprise all instances having the "False" label. As another example, Bucket 101 may comprise all instances having a wage of 30K-40K, while Bucket 102 may comprise all instances having a wage of above 40K-50K.

FIG. 1B shows clustering of instances comprised by Bucket 101 to three clusters: Clusters 111, 112 and 113. Clusters may group instances having similar valuations to the set of features. For example, Cluster 111 may comprise instances having similar hair color and similar age in between 30 and 35. In some exemplary embodiments, people with brown or black hair color that are at an age between 30 to 35 may not be required disclosed their exact age or hair color, while still allowing the disclosed subject matter to provide for a relatively precise labeling thereof. Due to them being members of a cluster that is in Bucket 101, a label may be determined based on the label of Bucket 101 and without requiring precise information relating to the age and hair color. Additionally or alternatively, a potentially alternative concrete instance may be generated that would be similarly located within Cluster 111, and such concrete instance may be used to determine the label of the actual instance, for example, by applying a decision model on the potentially alternative concrete instance. It is noted that in the illustrated example of FIG. 1B, other ranges of age may not be generalized based on the current data, on the current clusters, or the like. As an example, people at the age between 40 and 60 may have to disclose their exact age.

In some exemplary embodiments, the larger the dataset and the less outliers there are in the data, the more generalization may be possible using clustering.

In some exemplary embodiments, a generalization may be provided by indicating to which cluster an instance belongs. Additionally or alternatively, the generalization may include an indication for each cluster whether the instance belongs to it and a membership measurement relating thereto.

In some exemplary embodiments, the generated clusters (and thus the alternative feature sets) may not cover the whole domain, and it is therefore possible that a data point that does not map into any of the clusters may be received later on. In this case, it is possible to either: not generalize such data points, or map it to the closest cluster, thus enabling generalization but possibly losing some accuracy.

Figure 1C:
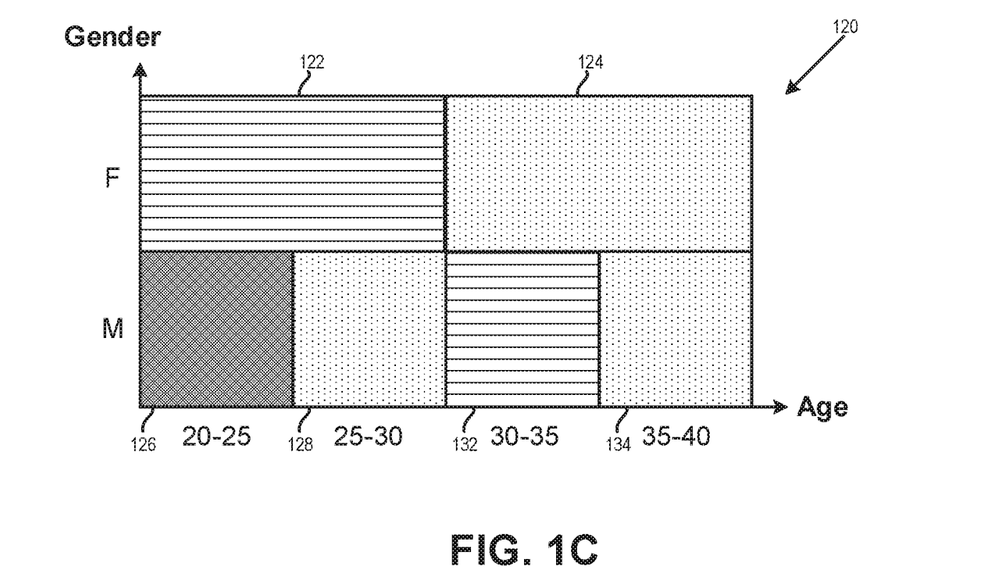
FIG. 1C shows a decision map, in accordance with some exemplary embodiments of the disclosed subject matter.

Referring now to FIG. 1C showing an illustration of a decision map, in accordance with some exemplary embodiments of the disclosed subject matter.

Decision Map 120 may be determined based on buckets and clusters, such as the buckets and clusters of FIGS. 1A and 1B. Decision Map 120 may illustrate an alternative set of features corresponding to the set of features in FIGS. 1A and 1B. FIGS. 1A and 1B have illustrates an example having 3 features. For simplicity, Decision Map 120 illustrates 2 alternative features, age and gender. Decision Map 120 generalizes the age feature. The age feature is represented using four sub domains: (20-25), (25-30), (30-35), (35-40). Each area may correspond to a different label. Instances that are in Area 122 or Area 132 may have a first label, instances that are in Area 124, Area 128 or Area 134 may have a second label and instances that in area 126 may have a third label. As an example, an instance may have a "Female" valuation for the gender feature and a value of 23 as a valuation for the age feature. The instance may be located at Area 122 and have the first label.

In some exemplary embodiments, for some features, other features may be further generalized, yielding a conditional generalization. As an example, as can be seen in Decision Map 120, in case that an instance has a "Female" value for the gender the generalized age feature may have two sub domains instead of four sub domains: (20-30) and (30-40). In some exemplary embodiments, the disclosed subject matter may be used in order to minimize the data that is obtained from a user. In case that the user is a woman, it may suffice to know if her age is between 20 and 30 or between 30 and 40.

In some exemplary embodiments, Decision Map 120 may be generated based on the clusters. In some exemplary embodiments, Decision Map 120 may comprise areas, each of which corresponds to a different cluster. In such a case, the areas may have a potentially irregular shape, may overlap, portions of the space may be not associated with any area, or the like. In some exemplary embodiments, Decision Map 120 may be generated as an abstraction of the clusters, such as by defining lines that separate clusters associated with different labels. In some exemplary embodiments, straight lines may be utilized to divide the space defined by Decision Map 120 into areas, such that each area substantially comprises clusters associated with a same label. In some cases, lines that are parallel to the axes may be utilized so as to provide definite segmentation of the values of the axes into sub-domains.

Figure 1D:
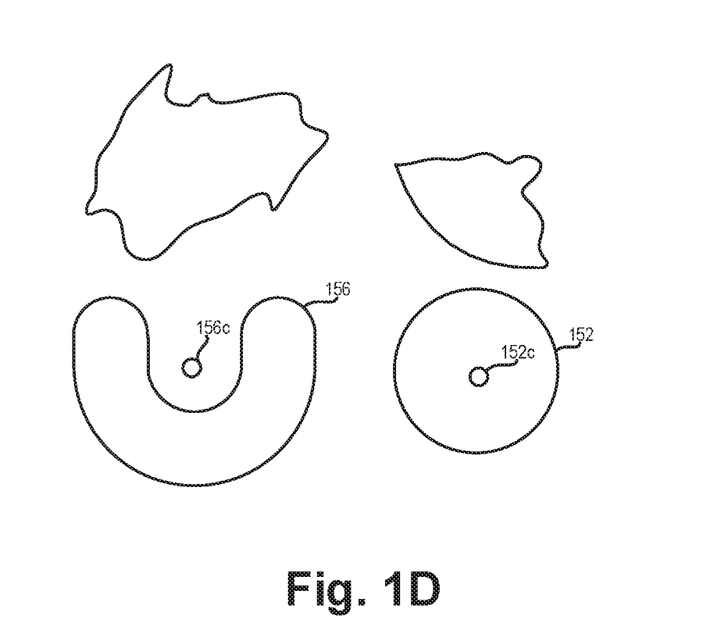
FIG. 1D shows an illustration of clusters, in accordance with some exemplary embodiments of the disclosed subject matter.

Referring now to FIG. 1D showing an illustration of clusters, in accordance with some exemplary embodiments of the disclosed subject matter.

In some exemplary embodiments, a 2-dimensional feature space may be illustrated to visually show clusters. A cluster may be a shape in the feature space. In a 2-dimensional space, the shape may be a 2-dimensional shape, which may or may not be symmetrical. Cluster 152 exemplifies a cluster in the form of a circle. A Centroid 152c that is the center of Cluster 152 is inside Cluster 152. Centroid 152c may be used as a concrete instance when computing a label for a generalized instance that is comprised by Cluster 152. Additionally or alternatively, a Cluster 156 may not be convex group. Centroid 156c of Cluster 156 is external to Cluster 156. In some exemplary embodiments, when a concrete instance for Cluster 156 is generated, Centroid 156c may not be used as is. In some cases, an alternative observed instance may be selected. Additionally or alternatively, an observed instance that is the closest to Centroid 156c may be used. Additionally or alternatively, a centroid of a cluster may only be used if it was observed. Otherwise, an alternative observed instance that is within the cluster and closest thereto may be used.

Figure 2:
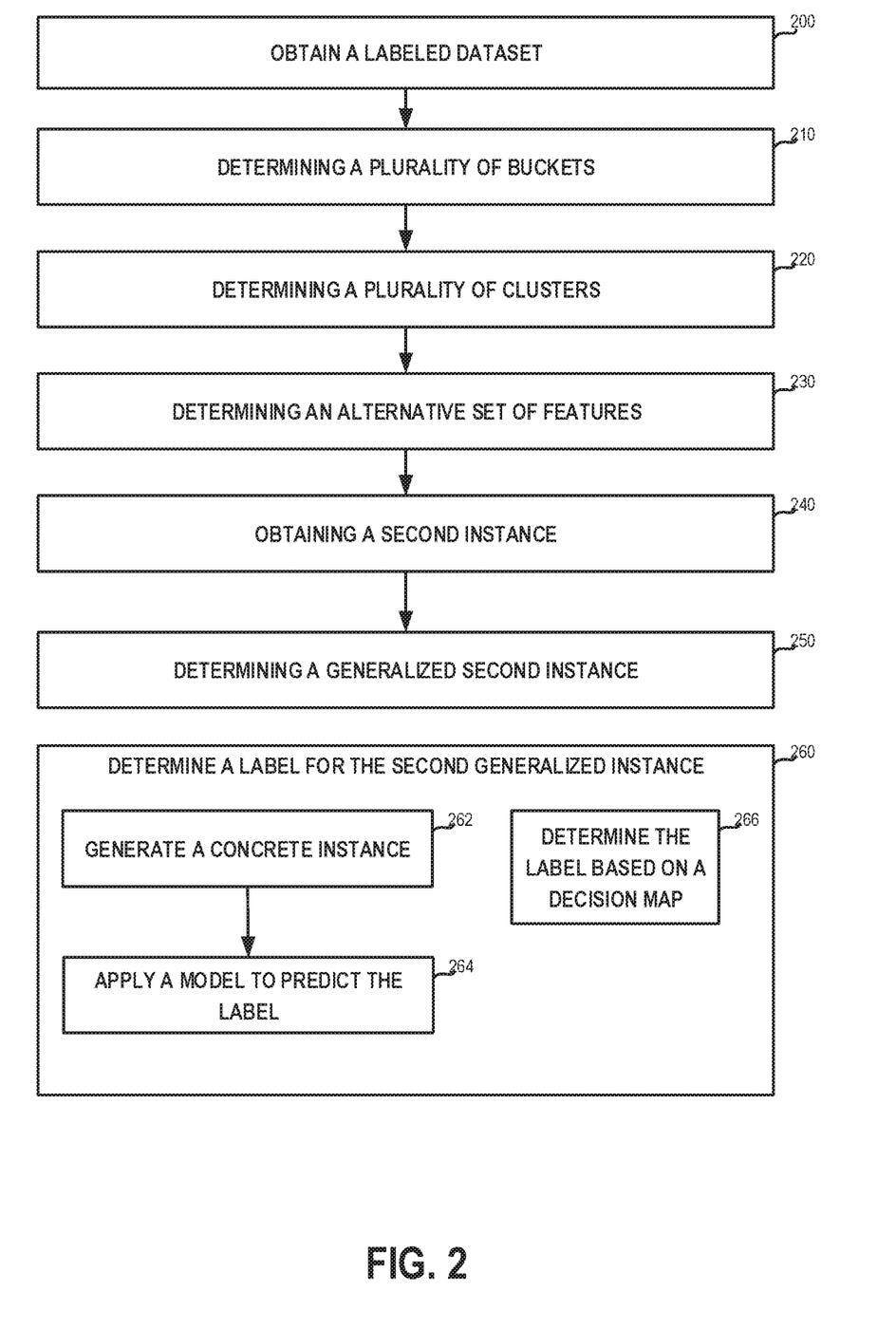
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 200, a labeled dataset may be obtained. The labeled dataset may comprise instances and labels thereof. In some exemplary embodiments, the labels of the labeled dataset may be obtained by applying a decision model on a dataset of unlabeled instances. In some exemplary embodiments, the decision model may be a predictive model configured to determine a label for an instance, thereby providing a predicted label which may or may not be accurate. Additionally or alternatively, the labeled dataset may be a labeled dataset gathered from any other source or using any other methodology.

On Step 210, a plurality of buckets may be determined. Each bucket may be associated with a label. In some exemplary embodiments, each bucket may group instances comprised by the labeled dataset that have the same label. Additionally or alternatively, a bucket may comprise instances having similar but not necessarily identical labels. In some exemplary embodiments, grouping of instances may be based on a similarity threshold. The threshold may define how similar a label of an instance and the associated label of the bucket should be. In some exemplary embodiments, the similarity threshold may be an equity threshold, yielding that only instances having the exact label as the label that is associated with bucket may be grouped to the bucket. In some exemplary embodiments, a similarity measurement may be computed based on the label that is associated with the bucket and based on the label of each instance. The similarly measurement may be compared to the similarity threshold to determine whether the instance is a member of the bucket.

On Step 220, a plurality of clusters may be determined. The plurality of clusters may be determined for each bucket. In some exemplary embodiments, the plurality of clusters may be determined for each bucket separately and independently. In some exemplary embodiments, a single instance may be a member of more than one cluster. Additionally or alternatively, the clusters may or may not have an overlap therebetween. In some exemplary embodiments, each cluster may be comprised by exactly one bucket. Each cluster may comprise similar instances. The similarity of instances with respect to grouping into clusters may be based on a valuation of the set of features for each instance. In some exemplary embodiments, the determination of clusters may be performed using any clustering technique, such as but not limited to k-means clustering, centroid-based clustering, Distribution-Based Clustering, Density-Based Spatial Clustering of Applications with Noise (DBSCAN), Balanced Iterative Reducing and Clustering using Hierarchies (BIRCH), or the like.

On Step 230, an alternative set of features may be determined. In some exemplary embodiments, the alternative set of features may be a generalization of the set of features. In some exemplary embodiments, the alternative set of features may comprise a portion of the features, one or more generalized features, or the like. Additionally or alternatively, the alternative set of features may comprise generalized features. A generalized feature may correspond to a feature comprised by the set of features. The feature may have domain of possible values. The generalized feature may have a reduced domain, comprising a fewer number of possible values, each of which corresponding to a sub domain in the domain. In some exemplary embodiments, a generalized feature may be determined based on a cluster, such as a cluster that was determined on Step 220. In some exemplary embodiments, a generalized feature may be a feature indicating membership of the instance to a cluster. In some exemplary embodiments, the generalized feature may indicate membership and membership measurement. For example, instead of a set of features comprising 50 different features, an alternative set may comprise 10 alternative features, each of which indicates membership of the instance to a different cluster. It may be noted that in some cases, there may be more alternative features than original features. In some exemplary embodiments, using the alternative set of features may provide for a reduced divulgence of private information of users. Such reduced divulgence may also be applicable even if the number of alternative features is greater than the number of original features.

On Step 240, a second instance may be obtained. The second instance may be an unlabeled instance. In some exemplary embodiments, it may be desired to determine a label for the second instance. In some exemplary embodiments, the second instance may be an instance that was not used by the disclosed subject matter previously, such as was not included in the labeled dataset of Step 200. Additionally or alternatively, the second instance may be an instance that was not used to train a predictive model utilized in accordance with the disclosed subject matter. In some exemplary embodiments, the second instance may be mapped to one or more identified clusters, such as based on the valuation of the set of features, as defined in the second instance.

On Step 250, a generalized second instance may be determined. The second generalized instance may be a generalization of the second instance. In some exemplary embodiments, the generalized second instance may comprise a valuation of the alternative set of features. In some exemplary embodiments, the second generalized instance may be determined by mapping a valuation of the features of the second instance to a valuation of the alternative set of features. Additionally or alternatively, the second generalized instance may be determined based on membership of the second instance to the different clusters determined in Step 220.

On Step 260, a label for the second generalized second instance may be determined. The label that is determined for the second generalized instance may be utilized as a label for the second instance. In some exemplary embodiments, determining a label for the second generalized instance may comprise performing Step 262 and Step 264. Additionally or alternatively, determining a label for the second generalized instance may comprise performing Step 266.

On Step 262, a concrete instance may be generated. The concrete instance may be generated based on the second generalized instance. The concrete instance may comprise a valuation for features comprising the set of features that is in line with the second generalized instance. In some exemplary embodiments, the second generalized instance may indicate one or more clusters that comprise the second instance, such as via values of the alternative set of features. The concrete instance may be generated so as to provide an instance that is a member of the one or more clusters that comprise the second instance. The concrete instance may be potentially different than the second instance. In some exemplary embodiments, both for the concrete instance and for the second instance, a same generalization—the generalized second instance—may be utilized.

In some exemplary embodiments, the concrete instance may be a centroid of the cluster that comprises the second instance. Additionally or alternatively, the centroid may be utilized after verifying that the centroid is also a member of the cluster. Additionally or alternatively, in order to avoid utilizing fabricated and unrealistic values, observed instances may be utilized. An observed instance may be an instance that was observed during the application of the disclosed subject matter, such as an instance in the labeled dataset, an instance obtained to be labeled (e.g., the second instance of Step 240), or the like. In some exemplary embodiments, an observed instance may be selected and utilized as the concrete instance. The selection may be based on a relationship between the observed instance and the centroid or another statistical representation of all observed instances. For example, the observed instance that is closest to the centroid and that is comprised within the cluster may be selected and utilized. Additionally or alternatively, s in case the generalized second instance indicates membership to more than a single cluster, the concrete instance may be selected from the observed instances that are members of the same set of clusters as the second instance. Additionally or alternatively, a top cluster may be determined based on the membership measurements and a concrete instance in the top cluster may be generated.

On Step 264, a model may be applied on the concrete instance in order to predict a label for the second instance. In some exemplary embodiments, the model may be a decision model that was used to label the labeled dataset of Step 200. Additionally or alternatively, the decision model may be an automated model, such as implemented using machine learning techniques, a manual model, or the like.

On Step 266, a label may be determined based on a decision map, such as Decision Map 120. Each area in the decision map may correspond to a label. By determining a valuation for the alternative set of feature, a generalized instance may be mapped to an area and a label may be determined based thereon.

Additionally or alternatively, the label may be determined based on a label of a cluster that comprised the second instance. Additionally or alternatively, in case there are multiple clusters that comprise the second instance, the labels thereof may be utilized, such as by computing a weighted average thereof. Weights of the weighted average may be based on membership measurements of the second instance to the different clusters, as may be recorded in the generalized second instance.

Figure 3:
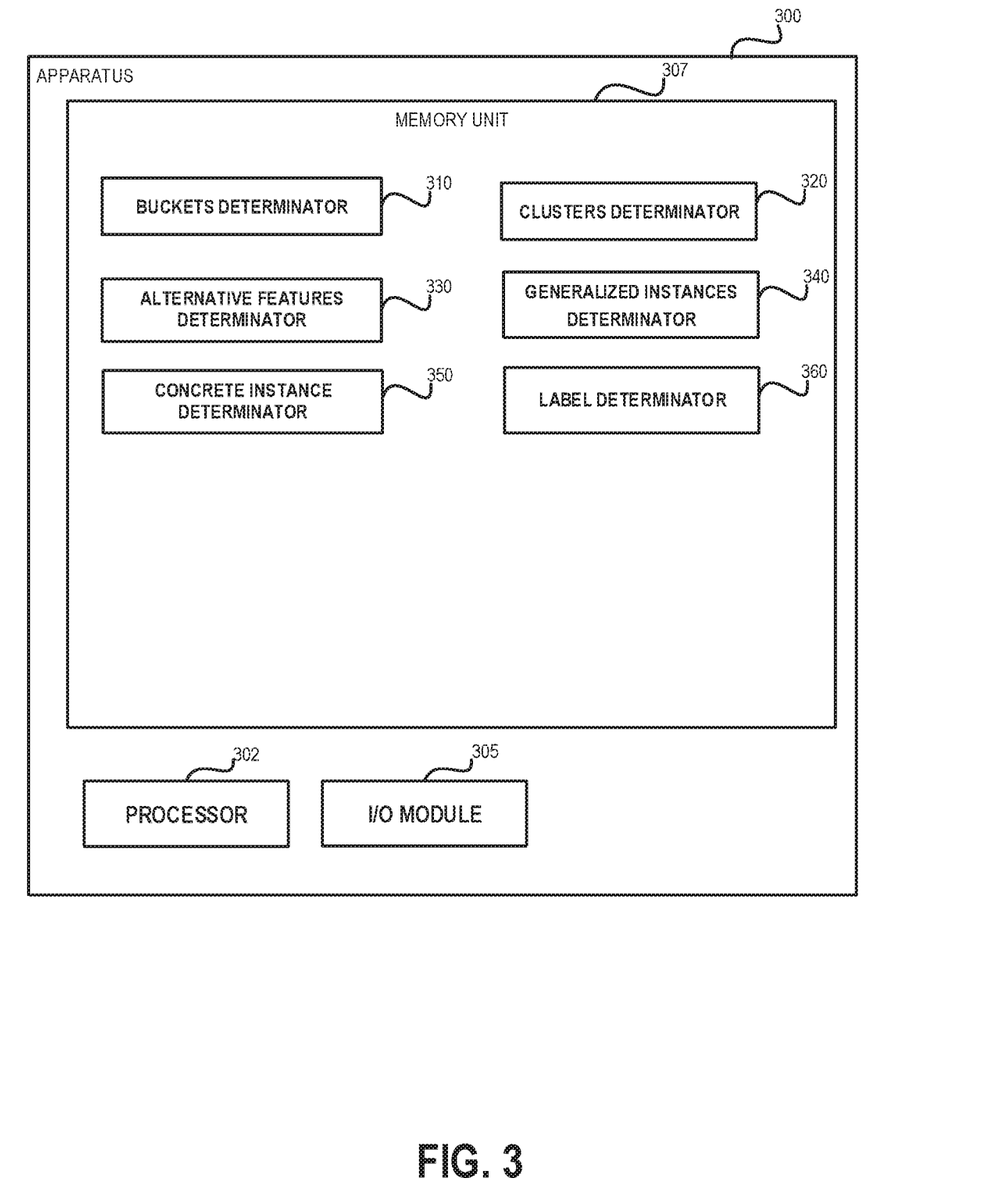
FIG. 3 shows a block diagram of an apparatus, in accordance with some exemplary embodiments of the disclosed subject matter.

Referring now to FIG. 3 showing a block diagram of an apparatus, in accordance with some exemplary embodiments of the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of its subcomponents.

In some exemplary embodiments of the disclosed subject matter, Apparatus 300 may comprise an Input/Output (I/O) Module 305. I/O Module 305 may be utilized to provide an output to and receive input from a user, such as, for example obtaining a s generalized instance, providing a prediction, or the like. In some exemplary embodiments, I/O Module 305 may be configured to obtain a predictive model, obtain a dataset, obtain a labeled dataset, or the like. Additionally or alternatively, I/O Module 305 may be configured to transmit a generalized instance.

In some exemplary embodiments, Apparatus 300 may comprise Memory Unit 307. Memory Unit 307 may be a hard disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300. In some exemplary embodiments, Memory Unit 307 may store datasets, measurements performance results, or the like. Additionally or alternatively, Memory Unit 307 may store a predictive model, a bucket, a cluster, or the like.

Memory 307 may comprise one or more components as detailed below, implemented as executables, libraries, static libraries, functions, or any other executable components.

In some exemplary embodiments, a Buckets Determinator 310 may be configured to determine buckets for a labeled dataset based on the labels thereof. A bucket may be a data structure holding an instance, a reference to the instance, or the like. Each bucket may hold instances having the same label or instances having similar labels.

In some exemplary embodiments, a Clusters Determinator 320 may be configured to determine clusters of instances within a bucket. In some exemplary embodiments, Clusters Determinator 320 may determine the clusters using any clustering technique, such as but not limited to k-means clustering, centroid-based clustering, Distribution-Based Clustering, Density-Based Spatial Clustering of Applications with Noise (DBSCAN), Balanced Iterative Reducing and Clustering using Hierarchies (BIRCH), or the like. Clusters Determinator 320 may utilize any clustering algorithm, such as but not limited to K-means, Hierarchical clustering, Affinity Propagation, or the like. In some exemplary embodiments, Clusters Determinator 320 may determine, independently, clusters in each bucket determined by Buckets Determinator 310.

In some exemplary embodiments, an Alternative Features Determinator 330 may be configured to determine an alternative set of features. The alternative set of features may be a generalization of the set of features. The alternative set of features may comprise a generalized feature having a generalized domain corresponding to a feature having a domain. Each generalized feature comprised by the set of alternative features may correspond to a cluster.

In some exemplary embodiments, a Generalized Instances Determinator 340 may be configured to determine a generalized instance for a concrete instance. In some exemplary embodiments, the generalized instance may have a valuation of the alternative set of features. Generalized Instances Determinator 340 may receive an instance having a valuation of features. Based on the valuation and based on the alternative set of features, Generalized Instances Determinator 340 may output a generalized instance.

In some exemplary embodiments, a Concrete Instance Determinator 350 may be configured to determine a concrete instance based on a generalized instance. In some exemplary embodiments, the generalized instance may indicate that it represents an instance that is a member in a cluster. Concrete Instance Determinator 350 may determine another member of the cluster as the concrete instance. In some exemplary embodiments, the concrete instance may be determined as a statistical representation, such as the mode, the mean, or the like, of instances comprised by the cluster, the centroid of the cluster, or the like. Additionally or alternatively, Concrete Instance Determinator 350 may be selected between observed instances that are comprised by the cluster. Additionally or alternatively, in case the generalized instance indicates a plurality of clusters, a top-most cluster may be selected and the concrete instance may be generated based thereon. Additionally or alternatively, the concrete instance may be generated based on the plurality of clusters, such as by generating an instance that is a member of all of the plurality of clusters.

In some exemplary embodiments, a Label Determinator 360 may be configured to determine a label for a concrete instance. Label Determinator 360 may determine the label for the concrete instance, such as by applying a decision model. In some exemplary embodiments, determining the label may be performed on a server. A computerized edge device may be configured to obtain an instance and to determine a generalized instance for the instance. The computerized edge device may transmit the generalized instance, the concrete instance, or the like, to the server in order for the server to determine a label for the instance based on the generalized instance. In such an embodiment, minimized data is transferred to the server, reducing exposure of potentially private information that is locally stored on the edge device.

In some exemplary embodiments, the server may determine the label by utilizing a predictive model. The predictive model may be trained based on a labeled dataset. Additionally or alternatively, the server may transmit the predictive model to the edge device. In some exemplary embodiments, the edge device may be configured to determine a label for the instance based on the second instance locally, without transmitting any data.

In some exemplary embodiments, exposing the end users to mapping functions determined based on the decision model, computed ranges determined based on the decision model, clusters determined based on the decision model, or the like, may disclose some information about the decision model itself, about training data thereof, or the like. In some cases, it may be desired to prevent end users, client devices, or the like, to gain access to such information about the decision model, which may be a trade secret.

In some exemplary embodiments, functional encryption may enable encrypting input to a certain function and computing the result of the function over encrypted data while the party performing the computation is only able to decrypt the result of the computation. In some exemplary embodiments, a functional encryption scheme for a given functionality $f$ comprises the following four algorithms:

(pk, msk)←setup($1^\lambda$): creates a public key pk and a master secrete key msk.

sk←Keygen(msk, $f$): uses the master secret key to generate a new secret key sk for the function $f$.

c←Enc(pk, x): uses the public key to encrypt a message x.

y←Dec(sk, c): uses secret key to calculate y=$f$(x) where x is the value that c encrypts.

In some exemplary embodiments, the function $f$, such as a function mapping an original data point to a corresponding cluster or range, may be computed using a functional encryption scheme. In some exemplary embodiments, an edge device, such as a client terminal used by the user, may obtain data (d) from the user. The data (d) may be encrypted using the public key (pk). The edge device may transfer the encrypted data to the server, preventing the server from accessing the data itself. The server may decrypt the outcome of applying the function $f$ on the encrypted data ($f$(d)), using the secret key (sk) to receive the associated cluster or feature ranges relevant to the user. In some exemplary embodiments, using functional encryption, the client devices and users may not gain access to information enabling reverse engineering or understanding the decision model (or training dataset used to train it), while still protecting their privacy and ensuring that the actual data point (d) is not disclosed to the server.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method comprising:
obtaining a labeled dataset, wherein the labeled dataset comprises a plurality of instances and labels thereof, wherein each instance comprises a valuation of a set of features;
based on the labels, determining a plurality of buckets, each of which has an associated label, wherein each bucket groups instances from the labeled dataset that have a label that is within a similarity threshold from the associated label of the bucket;
determining a plurality of clusters, wherein each cluster comprises a plurality of instances that are comprised by a same bucket, wherein said determining a plurality of clusters is based on valuations of the set of features for the instances, whereby grouping similar instances into a cluster;
based on the plurality of clusters, determining an alternative set of features comprising a set of generalized features, wherein each generalized feature in the set of generalized features corresponds to a cluster of the plurality of clusters, wherein a generalized feature that corresponds to a cluster is indicative of the instance being a member of the corresponding cluster;
obtaining a second instance;
determining a generalized second instance, wherein the generalized second instance comprises a valuation of the alternative set of features for the second instance; and
based on the generalized second instance, determining a label for the second instance.

2. The method of claim 1, wherein the similarity threshold is an equality threshold, whereby each bucket groups instances from the labeled dataset that have the associated label of the each bucket.

3. The method of claim 1, wherein said determining the label for the second instance comprises:

based on the valuation of the alternative set of features of the second generalized instance, determining an identified cluster, wherein the second instance is mapped to the identified cluster; and wherein the label for the second instance is determined based on an associated label of a bucket that is associated with the identified cluster.

4. The method of claim 3, wherein said determining the identified cluster comprises determining a plurality of identified clusters, wherein the label for the second instance is determined based on one or more labels of one or more buckets that are associated with the plurality of identified clusters.

5. The method of claim 1, wherein said determining the label for the second instance comprises:

determining a concrete second instance based on the generalized second instance; and providing the concrete second instance to a predictive model, wherein the predictive model is configured to provide a second label for the second concrete instance.

6. The method of claim 5, wherein the concrete second instance is different than the second instance.

7. The method of claim 5, wherein the concrete second instance is a statistical representation of observed instances comprised by the cluster.

8. The method of claim 5, wherein the cluster comprises a centroid, wherein the centroid is inside the cluster, wherein the concrete second instance is the centroid of the cluster.

9. The method of claim 1, wherein said obtaining the generalized instance and said determining the generalized instance are performed on an edge device;

wherein the method further comprises: transmitting by the edge device to a server the generalized instance; and wherein said determining the label for the second instance based on the generalized instance is performed on a server.

10. The method of claim 1, wherein said obtaining the labeled dataset comprises:

obtaining the plurality of instances; and applying a predictive model on each of the plurality of instances to determine a label thereof, wherein the predictive model is configured to determine a label for an instance.

11. A computer program product comprising a non-transitory computer readable storage medium retaining program instructions, which program instructions when read by a processor, cause the processor to perform:

obtaining a labeled dataset, wherein the labeled dataset comprises a plurality of instances and labels thereof, wherein each instance comprises a valuation of a set of features;

based on the labels, determining a plurality of buckets, each of which has an associated label, wherein each bucket groups instances from the labeled dataset that have a label that is within a similarity threshold from the associated label of the bucket;

determining a plurality of clusters, wherein each cluster comprises a plurality of instances that are comprised by a same bucket, wherein said determining a plurality of clusters is based on valuations of the set of features for the instances, whereby grouping similar instances into a cluster;

based on the plurality of clusters, determining an alternative set of features comprising a set of generalized features, wherein each generalized feature in the set of generalized features corresponds to a cluster of the plurality of clusters, wherein a generalized feature that corresponds to a cluster is indicative of the instance being a member of the corresponding cluster;

obtaining a second instance;

determining a generalized second instance, wherein the generalized second instance comprises a valuation of the alternative set of features for the second instance; and based on the generalized second instance, determining a label for the second instance.

12. The computer program product of claim 11, wherein the similarity threshold is an equality threshold, whereby each bucket groups instances from the labeled dataset that have the associated label of the each bucket.

13. The computer program product of claim 11, wherein said determining the label for the second instance comprises:

based on the valuation of the alternative set of features of the second generalized instance, determining an identified cluster, wherein the second instance is mapped to the identified cluster; and wherein the label for the second instance is determined based on an associated label of a bucket that is associated with the identified cluster.

14. The computer program product of claim 11, wherein said determining the label for the second instance comprises:

determining a concrete second instance based on the generalized second instance; and providing the concrete second instance to a predictive model, wherein the predictive model is configured to provide a second label for the second concrete instance.

15. The computer program product of claim 14, wherein the concrete second instance is different than the second instance.

16. The computer program product of claim 14, wherein the concrete second instance is a statistical representation of observed instances comprised by the cluster.

17. The computer program product of claim 14, wherein the cluster comprises a centroid, wherein the centroid is inside the cluster, wherein the concrete second instance is the centroid of the cluster.

18. The computer program product of claim 11, wherein said obtaining the generalized instance and said determining the generalized instance are performed on an edge device;

wherein the method further comprises: transmitting by the edge device to a server the generalized instance; and wherein said determining the label for the second instance based on the generalized instance is performed on a server.

19. The computer program product of claim 11, wherein said obtaining the labeled dataset comprises:

obtaining the plurality of instances; and applying a predictive model on each of the plurality of instances to determine a label thereof, wherein the predictive model is configured to determine a label for an instance.

20. A computerized apparatus having a processor and coupled memory, the processor being adapted to perform the steps of:

obtaining a labeled dataset, wherein the labeled dataset comprises a plurality of instances and labels thereof, wherein each instance comprises a valuation of a set of features;

based on the labels, determining a plurality of buckets, each of which has an associated label, wherein each bucket groups instances from the labeled dataset that have a label that is within a similarity threshold from the associated label of the bucket;

determining a plurality of clusters, wherein each cluster comprises a plurality of instances that are comprised by a same bucket, wherein said determining a plurality of clusters is based on valuations of the set of features for the instances, whereby grouping similar instances into a cluster;

based on the plurality of clusters, determining an alternative set of features comprising a set of generalized features, wherein each generalized feature in the set of generalized features corresponds to a cluster of the plurality of clusters, wherein a generalized feature that corresponds to a cluster is indicative of the instance being a member of the corresponding cluster;

obtaining a second instance;

determining a generalized second instance, wherein the generalized second instance comprises a valuation of the alternative set of features for the second instance; and based on the generalized second instance, determining a label for the second instance.

\* \* \* \* \*